United States Patent [19]

Smith et al.

(10) Patent No.: US 7,821,958 B2
(45) Date of Patent: Oct. 26, 2010

(54) METHOD FOR ESTIMATING AND MONITORING TIMING ERRORS IN PACKET DATA NETWORKS

(75) Inventors: Roland A. Smith, Nepean (CA); Stephen Rayment, Ottawa (CA); Richard Sommerville, Nepean (CA); Chris Williams, Nepean (CA); Sam Onsy, Stittsville (CA)

(73) Assignee: BelAir Networks Inc., Kanata, Ontario (CA)

( * ) Notice: Subject to any disclaimer, the term of this patent is extended or adjusted under 35 U.S.C. 154(b) by 373 days.

(21) Appl. No.: 11/963,524

(22) Filed: Dec. 21, 2007

(65) Prior Publication Data

US 2009/0161744 A1 Jun. 25, 2009

(51) Int. Cl.
*G01R 31/08* (2006.01)
*H04J 3/06* (2006.01)
*H03D 3/24* (2006.01)

(52) U.S. Cl. .................. 370/252; 370/516; 375/376
(58) Field of Classification Search .............. None
See application file for complete search history.

(56) References Cited

U.S. PATENT DOCUMENTS

| 4,453,247 | A | * | 6/1984 | Suzuki et al. | 370/252 |
| 5,539,785 | A | * | 7/1996 | Burch et al. | 375/371 |
| 6,246,738 | B1 | | 6/2001 | Acimovic et al. | |
| 6,452,950 | B1 | * | 9/2002 | Ohlsson et al. | 370/516 |
| 6,601,004 | B2 | | 7/2003 | Ballantyne et al. | |
| 6,937,613 | B1 | | 8/2005 | Bedrosian | |
| 6,959,064 | B2 | | 10/2005 | Spijker et al. | |
| 7,012,982 | B1 | * | 3/2006 | Basch et al. | 375/371 |
| 7,035,365 | B2 | * | 4/2006 | Takatori et al. | 375/371 |
| 2004/0062278 | A1 | | 4/2004 | Hadzic et al. | |

OTHER PUBLICATIONS

Notification of Transmittal of the International Search Report and the Written Opinion of the International Searching Authority regarding International Application No. PCT/CA2008/00362, mailed Aug. 29, 2008.
International Search Report regarding International Application No. PCT/CA2008/00362.
Written Opinion of the International Searching Authority regarding International Application No. PCT/CA2008/00362.

* cited by examiner

*Primary Examiner*—Nittaya Juntima
(74) *Attorney, Agent, or Firm*—Katten Muchin Rosenman LLP

(57) ABSTRACT

A system and method is provided for estimating the T1 timing error and clock recovery errors by processing timing information from the associated pseudowire packet stream(s) from which the T1 is derived. The timing errors are presented as MTIE measurements which are used to present alarms for a Network Operation Control centre and are used to accurately alarm error conditions where the regenerated or derived T1 signal does not meet MTIE or clock accuracy errors. This alarm is intended to detect conditions of excessive packet jitter, wander or phase transients which may exist in the data network over which the pseudowire stream is transported. In another aspect, the errors are used to control the regeneration of the T1 clock information.

76 Claims, 10 Drawing Sheets

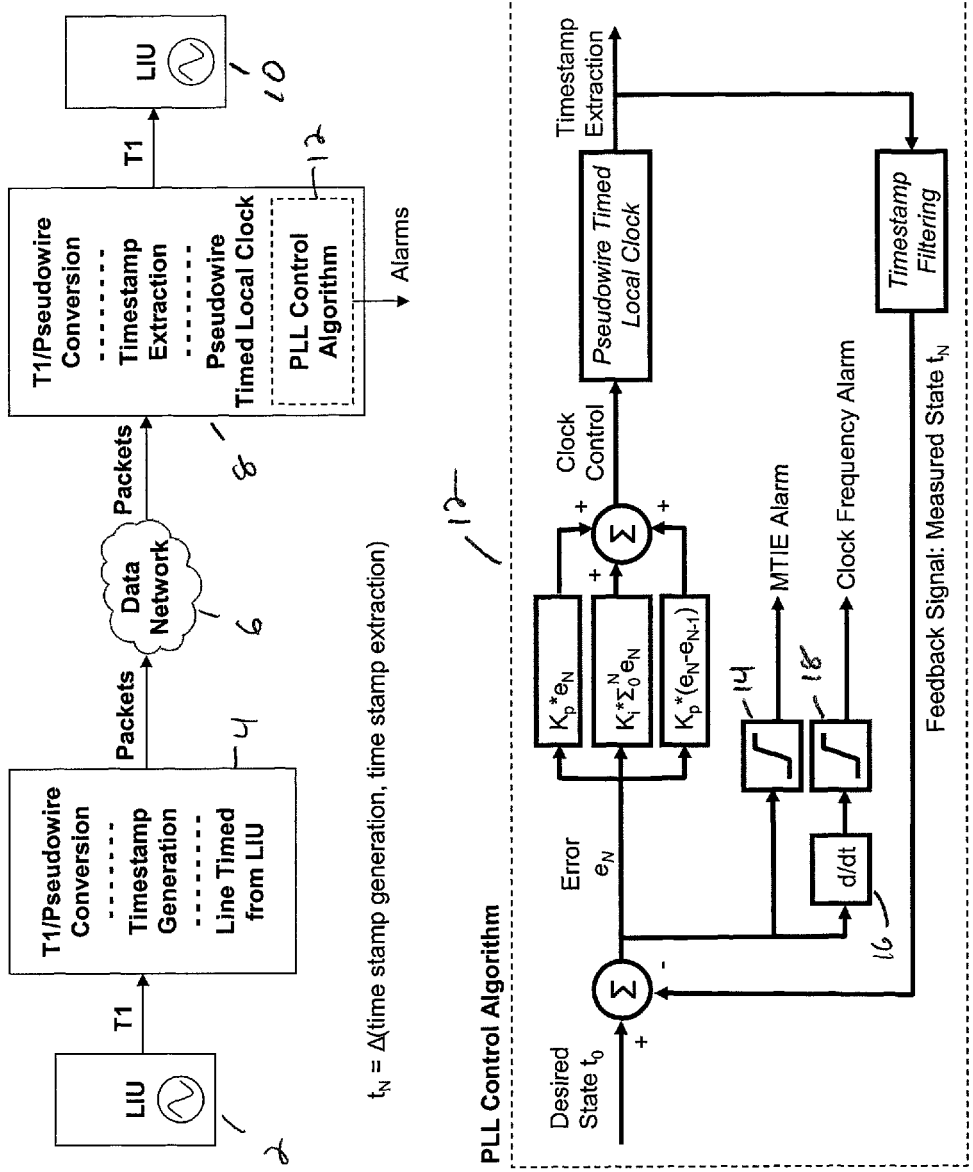
FIG. 9. Pseudowire PLL Clock Control Algorithm With Alarms

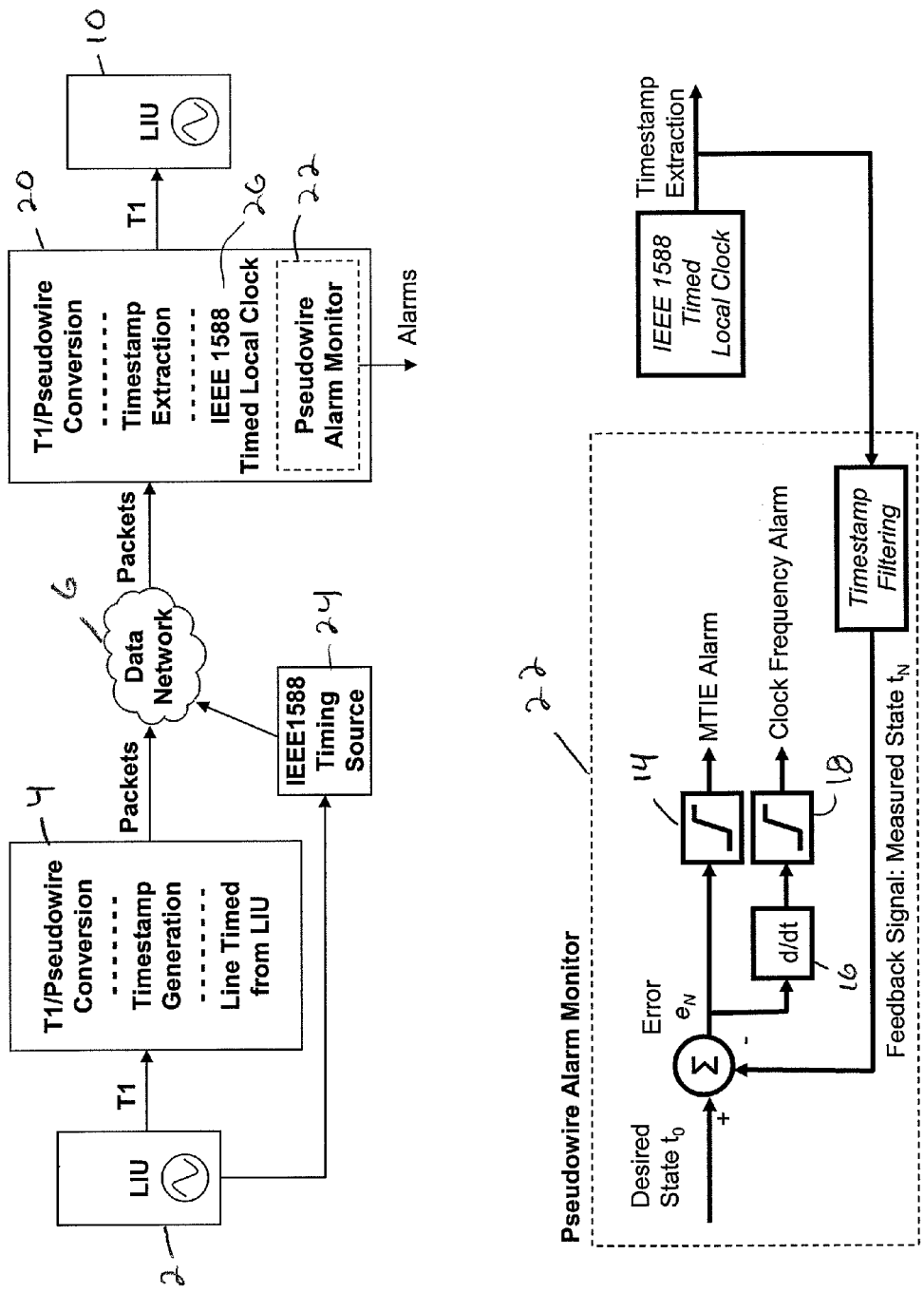
FIG. 10. IEEE1588 Timed Local Clock With Pseudowire Alarm Monitor

METHOD FOR ESTIMATING AND MONITORING TIMING ERRORS IN PACKET DATA NETWORKS

BACKGROUND OF THE INVENTION

1. Field of the Invention

The present invention relates to the estimation and monitoring of timing errors from packet data networks. More specifically, the present invention relates to a system and method for estimating timing/phase wander and for regenerating T1/DS1 clocks using information derived from timing pseudowire or packet data flows.

2. Background Art

Those of ordinary skill in the art of the present invention appreciate that there are problems in the current state of technology with time division multiplexing (TDM) timing recovery for a wireless network that uses TDM clocks regenerated from pseudowire packet data flows. Many networks rely on the timing accuracy of the regenerated TDM signals and demand a means of determining if the timing is correct.

Historically, cellular networks, and other communication equipment that uses T1/DS1 signals for both data transport and network traceable timing recovery have used wired T1/DS1 circuits. These wired circuits were either carried directly as T1 circuits, or were derived from wired T3/DS3 electrical or SDH/SONET optical circuits, all of which are TDM circuits. For example, T1 or DS1 circuits can be generated from T3 or DS3 circuits, capable of carrying 28 T1s. DS3 circuits can be transported in optical networks as STS-1 circuits, in which 3 STS-1 circuits can be carried in an OC-3. The same STS-1 circuits can be carried in higher TDM optical circuits such as OC-12, OC-48, OC-192 or OC-768. Alternately, other technologies, such as asynchronous transfer mod (ATM) can be used to carry the T1 circuits. At the destination, reverse mappings can be employed to obtain timing recovery signals.

Hardwired TDM circuits—i.e., non-cellular systems—have been well characterized and specified in ANSI T1.403-1999—the American National Standard Institute for Telecommunications—Network and Customer Installation Interfaces—DS1 Electrical Interface. The Standards Committee T1 Telecommunications responsible for this document specified in section 6.3 the key aspects of jitter, wander, and phase transients that affect the ability of a receiver to recover data bits and track the recovered clock of the T1 signal. The key specifications are: maximum jitter of 5 UIpp (or unit intervals peak-to-peak) and 0.1 UIpp depending on jitter bandwidth; maximum network signal wander of 28 UI in a 24 hour period and 13 UI in a 15 minute interval; and maximum phase transients of 1.5 UI or instantaneous frequency shifts of 61 ppm. A unit interval is, in isochronous communication transmissions, the longest interval of which the theoretical durations of the significant intervals of a signal are all whole multiples. These key specifications enable telecommunication manufacturers to develop equipment that can be assured to interoperate.

The specifications for wander, both long term (24 hours) and short term (15 minutes), are defined as the wander measured against a primary reference source (PRS) detailed in ANSI T1.101. These specifications enable telecom engineers to develop synchronization algorithms which filter the jitter, phase transients, and wander of a T1 network interface to derive a clock that is suitable for global system for mobile communications (GSM) timing requirements.

As discussed, the important specifications for T1 wander from T1.403 (§6.3.1.2) for a T1 traffic interface are: <13 UIpp in 15 minutes; and <28 UIpp over 24 hours. Similar standards are specified for E1 (2.048 Mbps) circuits used in other parts of the world including Europe. The ETSI specification G.823 details these values in Table 2 (E1 traffic interface) as 18 microseconds (µs) over 1000 s.

FIG. 1 illustrates a combined hard wired communication network and wireless communication network for which are prescribed specifications of T1 wander for a primary reference source. In FIG. 1, primary reference source (PRS) 2, which is part of public switch telephone network (PSTN) 4a, is transmitted over T1 line 6a through mobile switching center (MSC) 8, base station controller (BSC) 10, second T1 line 6b, through interworking function (IWF) gateway 12a, through PSTN 4b and then IWF gateway 12b, wherein the maximum end-to-end wander, peak-to-peak of PRS 2, must be less than 28 unit intervals (UI).

Additional standards are published for timing T1 and E1 circuits. T1.101, section 7.2.1 defines a timing T1 reference input with wander specified to 1 µs in 30 minutes (about 2000 seconds), and 2 µs in 72 hours (about 100,000 seconds). ETSI specification G.823, Table 12, defines a plesiochronous digital hierarchy (PDH) synchronization interface with similar wander requirements of 2 µs in 2000 seconds and 5.33 µs in 100,000 seconds.

The standards described above for T1 and E1 timing circuits are defined largely for T1's generated by building integrated timing supply (BITS) units that are found in virtually all central offices. BITS are used to generate very high quality clocks to be fed to all telecommunications equipment requiring timing within a central office. These timing T1 circuits are expensive and are not available outside of central offices, and as such are not used for GSM base station timing applications.

GSM networks have specified rigorous timing requirements for the base transceiver stations (BTS) that are the wireless point of connectivity for mobile stations or more typically, cell phones. The clock used in the GSM base station must be traceable to the base station controller/mobile switching centre (BSC/MSC) to within an absolute accuracy of better than ±50 parts per billion (PPB). The BTS uses the recovered T1 to generate a recovered clock which meets the ±50 ppb specification and from that clock, derives the timing of both the cellular radio frequency carriers as well as the bit level timing of the GSM transmitted bits streams.

The effects of a clock error can be significant. An error of ±50 ppb will result in a frequency offset of approximately ±100 Hz, which on a 200 kHz RF carrier is not significant. However, an error of ±1000 ppb (or ±1 part per million—ppm) will yield a 2 kHz or 1% error in the RF channels and may result in adjacent channel interference and possibly non-compliances in the radio spectrum mask.

Whereas timing errors on the RF carriers can cause increased interference and radio non-compliances, timing errors in the GSM bit streams can result in network failures. GSM utilizes the recovered ±50 ppb clock to generate time division multiple access (TDMA) frames allowing up to eight mobile stations (MS) to maintain cellular calls with full rate coding, or sixteen MS using half rate coding. From GSM 05.01 v5.4.0, section 5, the ±50 ppb T1 derived clock is used to generate 3.69 µs bit periods, 0.577 millisecond (ms) timeslots, 4.515 ms TDMA frames, 120 ms multiframes (26 TDMA frames), 6.12 second superframes (51 multiframes), and 3 hour, 28 minute, and 53 second hyperframes (2048 superframes). Mobility handoffs rely on the synchronization of this chain of timings, all of which are derived from the recovered T1 clock. Included in these timing errors is the Doppler effect at the MS that accounts for high speed vehicular motion, and which translates into an effective timing error at the MS. At 1.9 GHz, the RF wavelength is 15 centimeters (cm), and a vehicle traveling at 120 km/hour will see an apparent clock error due to the Doppler effect of ±117 ppb. This error, added to the GSM requirement for ±50 ppb, yields ±167 ppb. The standard is defined to operate within up to ±300 ppb of effective timing error including Doppler effects before handovers start to fail. The GSM standard has been designed, assuming that ±50 ppb is achieved at the T1 timing interface, to support vehicular handoff at speeds up to 250 km/hour. The GSM standard was intended to address all land vehicular handoff cases; however, it did not account for the 350 km/hour super-trains found throughout Europe, and which demanded a revision of GSM—called GSM-R—to specifically to address these unique requirements.

GSM is an impressive mobility cellular network solution, but its operation is contingent upon the T1 clock derived from the PSTN. As long at this T1 interface meets the well defined wander and timing specifications for traffic T1 circuits, the network is designed to operate well. However, if the T1 circuits deviate from the timing specification, then deleterious results can be seen. If, for example, the T1 circuits deliver a ±200 ppb timing error for a short period of about 15 minutes, then an increase in MS handoff failures will occur for vehicles traveling above 100 km/hour (about 60 miles per hour). If the timing error exceeds ±250 ppb for the same period, then vehicles traveling faster than 50 km/hour will experience handoff failures. Finally, if the timing error exceeds ±300 ppb, then all vehicular traffic will experience mobility handoff failures, leaving the network to be operable only for pedestrian traffic.

Over the years, network operations centers (NOCs) have developed tools to monitor handoff failures and dropped calls, as an overall metric of network or BTS correct operation. NOCs typically employ a 3% dropped call rate to alarm mobility handoff and call setup problems, which can be caused by multiple factors. The dropped call alarm alerts the NOC staff to begin a time critical investigation to diagnose the root cause that may be traffic related, or network related. For example, a temporary increase in dropped calls may be indicative of an excessive traffic load beyond the designed parameters of the BTS site. Antenna failures or misalignments can result in increased dropped calls. Problems in adjacent BTS sites—power outages, or mean time between failure (MTBF) errors—can inadvertently affect traffic by shifting call traffic from one site to another. PSTN issues, such as loss of a T1 through a configuration error, can reduce traffic capacity and cause increased dropped calls. Finally, loss of stratum traceability, where any of the multiple switches and transport devices used to carry the T1 from the central office (CO) to the BTS site has entered holdover state, may result in handover failures. Cellular operators have developed alarms for all of these conditions, allowing a network level excessive dropped call rate to be logically and quickly diagnosed, keeping mean time to repair (MTTR) low. The introduction of pseudowire solutions for cellular backhaul has brought on a new set of network issues to diagnose. Unlike traditional TDM networks, which deliver T1 bit streams directly from the MSC/BSC to the CO, with well defined timing and data integrity requirements, pseudowire solutions rely on Ethernet/IP packet transport and clock regeneration at the BTS site. Whereas T1 TDM networks are specified with error rates better than $10^{-9}$ to yield a minimum of 72 hours of error free operation, packet networks were built on the premise of achieving network resiliency through network path switching, with little regard for delay variations caused by network topology changes, or for the loss of packets that occur during these transitions. As mentioned, T1 TDM networks are generally verified for 3 days of zero bit error rate for T1 circuits. The actual specification is given in specification ITU-T Recommendation G.826 "Error performance parameters and objectives for international, constant bit rate digital paths at or above the primary rate" which presents a BBER (block BER) 2*10-4 for a 27,000 km path or 1% of per 500 km, for a block size of 4632 bits (24 frames) which is equivalent to a BER of 4.31×10-8. Therefore, a target of 10-9 is considered acceptable performance for a T1 TDM circuit.

Other patents and published applications, as well as co-pending applications, include subject matter that can be considered related to the embodiments of the present invention below. Such documents include U.S. Published Patent Application No. 20070189164, entitled "System and Method for Packet Timing of Circuit Emulation Services Over Networks", which details innovations in modifying the timing of pseudowire packet flows to largely eliminate micro-beating to enable very fine timing recovery such as is required for GSM networks; co-pending U.S. Non-provisional Utility patent application Ser. No. 12/027,894, entitled "Method and system for Controlling Link Saturation of Synchronous Data across Packet Networks", which describes innovations in avoiding and limiting saturation conditions which can inadvertently affect the pseudowire data stream; and U.S. patent application Ser. No. 11/938,396, entitled "Network Delay Shaping System and Method for Backhaul of Wireless Networks", which details network innovations for assuring absolute maximum delay of pseudowire derived traffic for wireless system, most specifically CDMA. Further, the following patents contain information related to T1 timing for GSM networks derived from a T1 signal: U.S. Pat. No. 6,104,915, entitled "Synchronization System Using Aging Prediction"; U.S. Pat. No. 6,178,215 entitled "Synchronization System for Reducing Slipping"; and U.S. Pat. No. 6,304,582 "Synchronization System Using Multiple Modes of Operation".

It would be preferable for pseudowire solutions to adapt to the stochastic variations in network operation affecting the packet stream, including: packet jitter, phase transients, and wander. Such solutions cannot rely on external or absolute references such as a global positioning system (GPS) timing input since the derived pseudowire timing is required to follow the MSC/BSC. As a result, it would be highly advantageous for the pseudowire solution to dynamically adapt to these stochastic variations, and when not possible, raise alarms for conditions where the ±50 ppb T1 timing cannot be achieved. Until now, however, there have been no reliable means of defining and alarming conditions where the regenerated T1 circuit is unable to achieve the GSM requirement of ±50 ppb.

SUMMARY OF THE INVENTION

According to an exemplary embodiment of the present invention, a system and method is provided for estimating the T1 timing error by filtering and processing the timing errors of the associated pseudowire packet stream from which the T1 circuit is derived. Accordingly, in one aspect, a method is provided for detecting conditions of packet jitter, packet phase transients, and packet wander, and of applying those measurements to accurately alarm parallel error conditions in the regenerated or derived T1.

According to another exemplary embodiment of the present invention, estimation and monitoring of timing errors from pseudowire packet data networks is performed by the system and method of the present invention. Exemplary embodiments of the present invention provide a system and method for estimating packet wander and determining the maximum time interval error (MTIE) of the pseudowire packet stream. Those of ordinary skill in the art of the present invention can appreciate that time interval error (TIE) is defined as a phase difference between a measured signal and a reference signal. MTIE is defined as the maximum TIE peak-to-peak value in some observation time t. According to further aspects, the present invention also details the means by which packet jitter and phase transients are measured and translated into bit or timing errors on the T1 signal. Further still, additional aspects of the present invention provide a system and method for detecting timing errors in the regenerated pseudowire data streams.

Accordingly, the exemplary embodiments of the present invention provides a system and method for estimating packet based parameters of jitter, phase transients, and wander, for one or multiple pseudowire streams. Furthermore, the exemplary embodiments of the present invention describe a system and method of alarms based on these parameters. These alarms are used to indicate and diagnose network packet transport problems that result in timing recovery errors in the derived T1 signals from the pseudowire streams.

According to still another aspect of the present invention, a packet MTIE specification is developed that indicates that the derived T1 clock may be exceeding the T1.403 (§6.3.1.2) wander specification for a T1 traffic interface, either over a 15 minute interval or a 24 hour interval. Using modified parameters, this aspect of the present invention can be used to derive packet MTIE for E1 (2.048 Mbps) pseudowire flows, and their derived E1 streams.

According to still another aspect of the present invention, a method is provided for analysis of packet jitter and phase transients that can have disruptive effects on the derived T1 signals. Further aspects of the present invention provide a system and method for analyzing and presenting packet jitter and phase transients in such a way as to indicate and diagnose network timing issues that can inadvertently affect the derived T1 timing. Jitter effects, such as those caused by a network path switch from a full duplex to a half duplex path, can cause significant effects in the packet arrival jitter, resulting in marginal packet buffering.

According to still a further aspect of the present invention, a system and method is provided for analyzing phase transients of the pseudowire packet stream, which indicates the presence of a semi-synchronous element that is inadvertently affecting the timing of the pseudowire packet stream such as a shared synchronous packet stream, which causes microbeating, or a backhaul element that may use a near-synchronous (e.g., WiMAX) wireless frequency hop.

Accordingly, the present invention presents a novel set of alarms and fault conditions that can be coupled into a network management system to aid in the detection and diagnosis of the network condition. These alarms can detect fault conditions such as those noted above, as the conditions can cause excessive MTIE and timing error in the recovered datastreams.

As those of ordinary skill in the art of the present invention can appreciate, that although the present invention is chiefly used with timing derived from a pseudowire packet stream, it is generally applicable to any derived timing signals, such as IEEE 1588 Precision Time Protocol (PTP) [whether version 1, 2 or subsequent versions] (equivalent to IEC 61588), which use IP packet flows to derive differential timing signals for high performance clock accuracy. In both cases, using a pseudowire data flow, or using a timing packet stream according to IEEE 1588, the packet stream can be processed to estimate a packet MTIE and therefore an estimate of the regenerated T1 MTIE and clock error.

Further still, those of ordinary skill in the art of the present invention appreciate that there are no cost effective timing sources for BTS systems that meet or exceed the ±50 ppb timing specification for GSM. Therefore, all clock sources, whether they be crystal oscillators, temperature compensated crystal oscillators, voltage controlled, or ovenized, among others, are required to be locked to the MSC clock in the CO to achieve the ±50 ppb specification. Thus, according to still a further aspect of the present invention, a system and method are presented to detect when derived timing sources do not meet their requirements.

It is therefore a general aspect of the invention to provide a system and method for estimating the T1 timing error by filtering and processing the timing errors of the associated pseudowire packet stream from which the T1 circuit is derived that will obviate or minimize problems of the type previously described.

According to a first aspect of the present invention, a method is provided for estimating a maximum time interval error of a T1 data signal derived from a pseudowire data stream, comprising the steps of: (a) establishing an initial relative delay of the pseudowire packet arrival times $t_N$; (b) monitoring changes to the relative delay $t_N$; and (c) obtaining a maximum time interval error (MTIE) based on the monitored changes to the relative delay. According to the first aspect, the step of establishing an initial relative delay of the pseudowire packet arrival times $t_N$ comprises using a plurality of fastest packets in the pseudowire data stream, and the step of monitoring changes to the relative delay $t_N$ comprises: estimating a subsequent relative delay $t_{N+1}$ of the pseudowire packet arrival times $t_N$; and subtracting $t_N$ from $t_{N+1}$ of the plurality of the fastest packets.

Still further according to the first aspect, the step of monitoring changes to the relative delay $t_N$ comprises: calculating differences between subsequent relative delays to indicate a maximum time interval error for the packet data network, and wherein the step of obtaining a maximum time interval error is estimated over a maximum time interval of fifteen minutes or 24 hours. The first aspect further comprises raising an alarm if an absolute value of $t_N-t_{N-1}$ exceeds at least one predetermined threshold, and wherein the at least one predetermined threshold can be expressed as one of bit periods, microseconds, or substantially any time period. According to the first aspect, the at least one predetermined threshold comprises a T1.101 specification threshold, and the at least one predetermined threshold further comprises a T1 jitter buffer threshold, and wherein the T1 jitter buffer threshold comprises about ±128 micro-intervals (UI).

The first aspect further comprises raising the alarm only if the absolute value of $t_N-t_{N-1}$ exceeds at least one predetermined threshold a predetermined number of times in a predetermined time period, and wherein the relative delay $t_N$ is derived from pseudowire packet time-stamps. According to the first aspect the relative delay $t_N$ is derived from pseudowire packet arrival times, or the relative delay $t_N$ is derived from either the fastest pseudowire packet arrival times, or a mean delay of the pseudowire packet arrival times. Further still, in the first aspect the MTIE is defined in unit intervals, microseconds, or substantially any other unit of time.

According to a second aspect of the present invention, a method for estimating a T1 clock error of a T1 data signal derived from a pseudowire data stream is provided, comprising the steps of: (a) establishing an initial relative delay of the pseudowire packet arrival times $t_N$; (b) monitoring changes to the relative delay $t_N$; and (c) estimating the T1 clock error by estimating the rate of change of the relative delay $t_N$. According to the second aspect the relative delay $t_N$ is derived from pseudowire packet time-stamps, the relative delay $t_N$ is derived from pseudowire packet arrival times, or the relative delay $t_N$ is derived from either the fastest pseudowire packet arrival times, or a mean delay of the pseudowire packet arrival times.

According to the second aspect, the step of estimating the T1 clock error comprises: calculating differences between subsequent relative delays to indicate a maximum time interval error for the packet data network; and calculating a difference between subsequent MTIE values. Still further according to the second aspect, the T1 clock error is defined in either parts per billion, or parts per million.

According to a third aspect of the present invention, a method for estimating pseudowire packet current clock estimate errors in packet data networks is provided comprising: (a) determining an initial maximum time interval error estimate, MTIE[n], and a subsequent maximum time interval error estimate MTIE[n+1]; (b) determining a current clock estimate error by calculating a derivative of a difference between MTIE[n] and MTIE[n+1] over a predetermined period of time; and (c) continuously updating the current clock estimate error by repeating steps (a) and (b) until n reaches a predetermined number.

According to the third aspect, the maximum time interval error estimate is determined over a maximum time interval of fifteen minutes or 24 hours, and the method further comprises raising an alarm if an absolute value of MTIE[n+1]-MTIE[n] exceeds at least one predetermined threshold. According to the third aspect, the at least one predetermined threshold can be expressed as one of parts per billion of a unit interval, parts per million of a unit interval, or substantially any time period and the at least one predetermined threshold comprises a global system for mobile communications (GSM) micro base transceiver station (BTS) specification threshold.

According to the third aspect of the present invention, the GSM micro base transceiver station specification threshold is about ±50 parts per billion, and wherein the GSM pico BTS specification threshold is about ±100 parts per billion, the third aspect further comprises raising the alarm only if the absolute value of MTIE[n+1]-MTIE[n] exceeds at least one predetermined threshold a predetermined number of times in a predetermined time period, and wherein the step of determining a current clock estimate error comprises: integrating a difference between MTIE[n] and MTIE[n+1] over a predetermined period of time.

According to a fourth aspect of the present invention, a method for estimating pseudowire packet maximum time interval errors in packet data networks is provided comprising: (a) estimating an initial relative delay $t_N$ of a plurality of fastest packets of a pseudowire data stream, wherein n is originally set to zero; (b) monitoring timing of a T1 data signal derived from an IEEE 1588 precision timing source; (c) verifying the timing of the T1 data signal derived from the IEEE 1588 precision timing source by using the initial relative delay $t_N$ as a zero maximum time interval error reference, and estimating a subsequent relative delay $t_{N+1}$ of the plurality of the fastest packets, subtracting $t_N$ from $t_{N+1}$ and using the difference between adjacent relative delays to further verify timing of the T1 data signal, such that if the difference between adjacent relative delays exceeds a predetermined threshold, verifying that the timing of the T1 data signal derived from the IEEE 1588 precision timing source is in error.

According to the fourth aspect, the step of estimating the relative delay $t_N$ of the plurality of fastest packets of a pseudowire data stream comprises: using the IEEE 1588 precision timing source to estimate the relative delay, and further comprises raising an alarm if an absolute value of $t_{N+1}-t_N$ exceeds at least one predetermined threshold.

According to the fourth aspect, the at least one predetermined threshold can be one of bit periods or microseconds, the at least one predetermined threshold comprises a T1.101 specification threshold, or the at least one predetermined threshold comprises a T1 jitter buffer threshold.

Still further according to the fourth aspect, the T1 jitter buffer threshold comprises about ±128 micro-intervals (UI), and the further comprises raising the alarm only if the absolute value of $t_{N+1}-t_N$ exceeds at least one predetermined threshold a predetermined number of times in a predetermined time period.

According to a fifth aspect of the present invention, a system for estimating a maximum time interval error of a T1 data signal derived from a pseudowire data stream, is provided comprising: a T1 data signal receiver configured to receive a pseudowire data stream, wherein the T1 data signal receiver includes a T1 data signal processor, and wherein the T1 data signal processor is configured to (a) establish an initial relative delay of the pseudowire packet arrival times $t_N$, (b) monitor changes to the relative delay $t_N$, and (c) obtain a maximum time interval error (MTIE) based on the monitored changes to the relative delay.

According the fifth aspect, the T1 data signal processor is further configured to use a plurality of fastest packets in the pseudowire data stream to establish an initial relative delay of the pseudowire packet arrival times $t_N$, and wherein the T1 data signal processor is further configured to estimate a subsequent relative delay $t_{N+1}$ of the pseudowire packet arrival times $t_N$, and subtract $t_N$ from $t_{N+1}$ of the plurality of the fastest packets to monitor changes to the relative delay $t_N$.

According to the fifth aspect, the relative delay $t_N$ is substantially constant if at least one of jitter, wander and phase transients remains at or below an ANSI T1.403-1999 specification value for jitter, wander or phase transients, and wherein the T1 data signal processor is further configured to estimate maximum time interval error over a maximum time interval of fifteen minutes or 24 hours.

Still further according to the fifth aspect, the T1 data signal processor is further configured to raise an alarm if an absolute value of $t_N-t_{N-1}$ exceeds at least one predetermined threshold. According to the fifth aspect, the at least one predetermined threshold can be expressed as one of bit periods, microseconds, or substantially any time period, and the at least one predetermined threshold comprises a T1.101 specification threshold, or the at least one predetermined threshold comprises a T1 jitter buffer threshold, and wherein the T1 jitter buffer threshold comprises about ±128 micro-intervals (UI).

According to the fifth aspect, the T1 data signal processor is further configured to raise the alarm only if the absolute value of $t_N-t_{N-1}$ exceeds at least one predetermined threshold a predetermined number of times in a predetermined time period, and the relative delay $t_N$ is derived from pseudowire packet time-stamps.

According to the fifth aspect, the relative delay $t_N$ is derived from pseudowire packet arrival times, or the relative delay $t_N$ is derived from either the fastest pseudowire packet arrival times, or a mean delay of the pseudowire packet arrival times, and further wherein the MTIE is defined in unit intervals, microseconds, or substantially any other unit of time.

According to a sixth aspect of the present invention, a system for estimating a T1 clock error of a T1 data signal derived from a pseudowire data stream is provided comprising: a T1 data signal receiver configured to receive a pseudowire data stream, wherein the T1 data signal receiver includes a T1 data signal processor, and wherein the T1 data signal processor is configured to (a) establish an initial relative delay of the pseudowire packet arrival times $t_N$, (b) monitor changes to the relative delay $t_N$, and (c) estimate the T1 clock error by estimating the rate of change of the relative delay $t_N$.

According to the sixth aspect, the relative delay $t_N$ is derived from pseudowire packet time-stamps, or the relative delay $t_N$ is derived from pseudowire packet arrival times. Still further according to the sixth aspect the relative delay $t_N$ is derived from either the fastest pseudowire packet arrival times, or a mean delay of the pseudowire packet arrival times.

According to the sixth aspect, the T1 data signal processor is further configured to calculate differences between subsequent relative delays to indicate a maximum time interval error for the packet data network, and calculate a difference between subsequent MTIE values to estimate the T1 clock error. According to the sixth aspect the T1 clock error is defined in either parts per billion, or parts per million.

According to a seventh aspect of the present invention, a system for estimating pseudowire packet current clock estimate errors in packet data networks, is provided comprising: a T1 data signal receiver configured to receive a pseudowire data stream, wherein the T1 data signal receiver includes a T1 data signal processor, and wherein the T1 data signal processor is configured to (a) determine an initial maximum time interval error estimate, MTIE[n], and a subsequent maximum time interval error estimate MTIE[n+1], (b) determine a current clock estimate error by calculating a derivative of a difference between MTIE[N] and MTIE[n+1] over a predetermined period of time, and (c) continue to update the current clock estimate error by repeating the determinations of (a) and (b) until n reaches a predetermined number.

According to the seventh aspect, the maximum time interval error estimate is determined over a maximum time interval of fifteen minutes or 24 hours, and the T1 data signal processor is further configured to raise an alarm if an absolute value of MTIE[n+1]-MTIE[n] exceeds at least one predetermined threshold.

According to the seventh aspect, the at least one predetermined threshold can be expressed as one of parts per billion of a unit interval, parts per million of a unit interval, or substantially any time period. According to the seventh aspect, the at least one predetermined threshold comprises a global system for mobile communications (GSM) micro base transceiver station (BTS) specification threshold, and wherein the GSM micro base transceiver station specification threshold is about +/−50 parts per billion, and still further the GSM pico BTS specification threshold is about +/−100 parts per billion.

According to the seventh aspect, the T1 data signal processor is further configured to raise the alarm only if the absolute value of MTIE[n+1]-MTIE[n] exceeds at least one predetermined threshold a predetermined number of times in a predetermined time period, and the T1 data signal processor is further configured to integrate a difference between MTIE[n] and MTIE[n+1] over a predetermined period of time to determine the current clock estimate error.

According to an eight aspect of the present invention, a system for estimating pseudowire packet maximum time interval errors in packet data networks is provided comprising: a T1 data signal receiver configured to receive a pseudowire data stream, wherein the T1 data signal receiver includes a T1 data signal processor, and wherein the T1 data signal processor is configured to (a) estimate an initial relative delay $t_N$ of a plurality of fastest packets of a pseudowire data stream, wherein n is originally set to zero, (b) monitor timing of a T1 data signal derived from an IEEE 1588 precision timing source; and (c) verify the timing of the T1 data signal derived from the IEEE 1588 precision timing source by using the initial relative delay $t_N$ as a zero maximum time interval error reference, and estimate a subsequent relative delay $t_{N+1}$ of the plurality of the fastest packets, subtract $t_N$ from $t_{N+1}$ and using the difference between adjacent relative delays to further verify timing of the T1 data signal, such that if the difference between adjacent relative delays exceeds a predetermined threshold, verify that the timing of the T1 data signal derived from the IEEE 1588 precision timing source is in error.

According to the eighth aspect, the T1 data signal processor is further configured to use the IEEE 1588 precision timing source to estimate the relative delay $t_N$ of the plurality of fastest packets of a pseudowire data stream, and the T1 data signal processor is further configured to raise an alarm if an absolute value of $t_{N+1}-t_N$ exceeds at least one predetermined threshold.

According to the eighth aspect, the at least one predetermined threshold can be one of bit periods or microseconds, the at least one predetermined threshold comprises a T1.101 specification threshold, or the at least one predetermined threshold comprises a T1 jitter buffer threshold. According to the eighth aspect, the T1 jitter buffer threshold comprises about ±128 micro-intervals (UI).

According to the eighth aspect, the T1 data signal processor is further configured to raise the alarm only if the absolute value of $t_{N+1}-t_N$ exceeds at least one predetermined threshold a predetermined number of times in a predetermined time period.

BRIEF DESCRIPTION OF THE DRAWINGS

The novel features and advantages of the present invention will best be understood by reference to the detailed description of the preferred embodiments that follows, when read in conjunction with the accompanying drawings, in which:

FIG. 9 illustrates an exemplary control system wherein timing for recovery of a pseudowire data stream is derived from the pseudowire stream according to an embodiment of the present invention.

FIG. 10 illustrates an exemplary control system wherein timing for recovery of a pseudowire data stream is derived from an IEEE 1588 clock source according to an embodiment of the present invention.

DETAILED DESCRIPTION OF THE PREFERRED EMBODIMENTS

Figure 1:
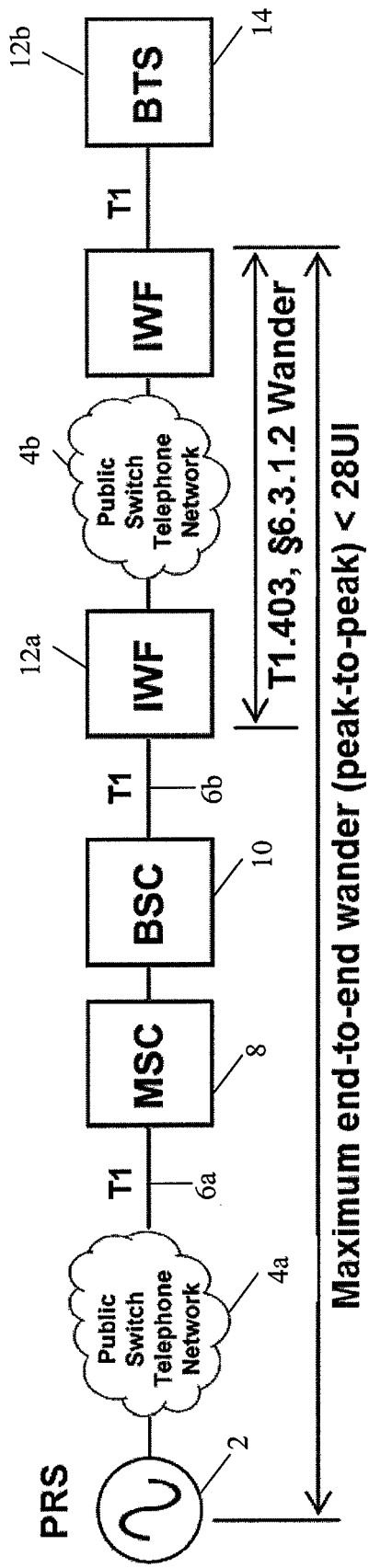
FIG. 1 illustrates a combined hard wired communication network and wireless communication network for which are prescribed specifications of T1 wander for a primary reference source.

The various features of the preferred embodiments will now be described with reference to the drawing figures, in which like parts are identified with the same reference characters. The following description of the presently contemplated best mode of practicing the invention is not to be taken in a limiting sense, but is provided merely for the purpose of describing the general principles of the invention.

According to a preferred embodiment of the present invention, a pseudowire packet MTIE and PPB estimator is provided that can be used to indicate that the derived T1 clock may be exceeding the wander specification for a T1 traffic interface, such as T1.403 (§6.3.1.2) either over one or multiple 15 minute intervals or a 24 hour interval. The packet MTIE estimator according to a preferred embodiment of the present invention presumes a constant network propagation delay for the fastest packets during a static period of the network operation. The packet MTIE estimator according to a preferred embodiment of the present invention selectively processes the time difference between the RTP packet timestamps, which are marked at the time the packet is generated by the T1 line timed node, and the marked timestamp that indicates when the packet is received by the respective pseudowire timed node. The clock used to generate the T1 signal timestamps the data packet when the data packet is generated. If one or other of the clocks runs faster (conversely slower) than the other, then the MTIE will exhibit those errors. The goal is to lock the two clocks together so that timing differences between the two are substantially minimized, or preferably eliminated, according to an exemplary embodiment of the present invention. When the two nodes' clocks are synchronized, the timestamp difference is constant. If the clocks are not locked, then the time difference increases or decreases accordingly with the differential clock error. The T1 MTIE is the peak value of the difference over a given period. The derivative of this MTIE is used to estimate the T1 clock error. As discussed above, the embodiments of the present invention and discussion herein have been directed towards T1 pseudowire data signals; however, those of ordinary skill in the art of the present invention can appreciate that the embodiments discussed herein can also be used for E1 pseudowire data signals, and/or bundled or unbundled T1 pseudowire data streams.

Figure 2:
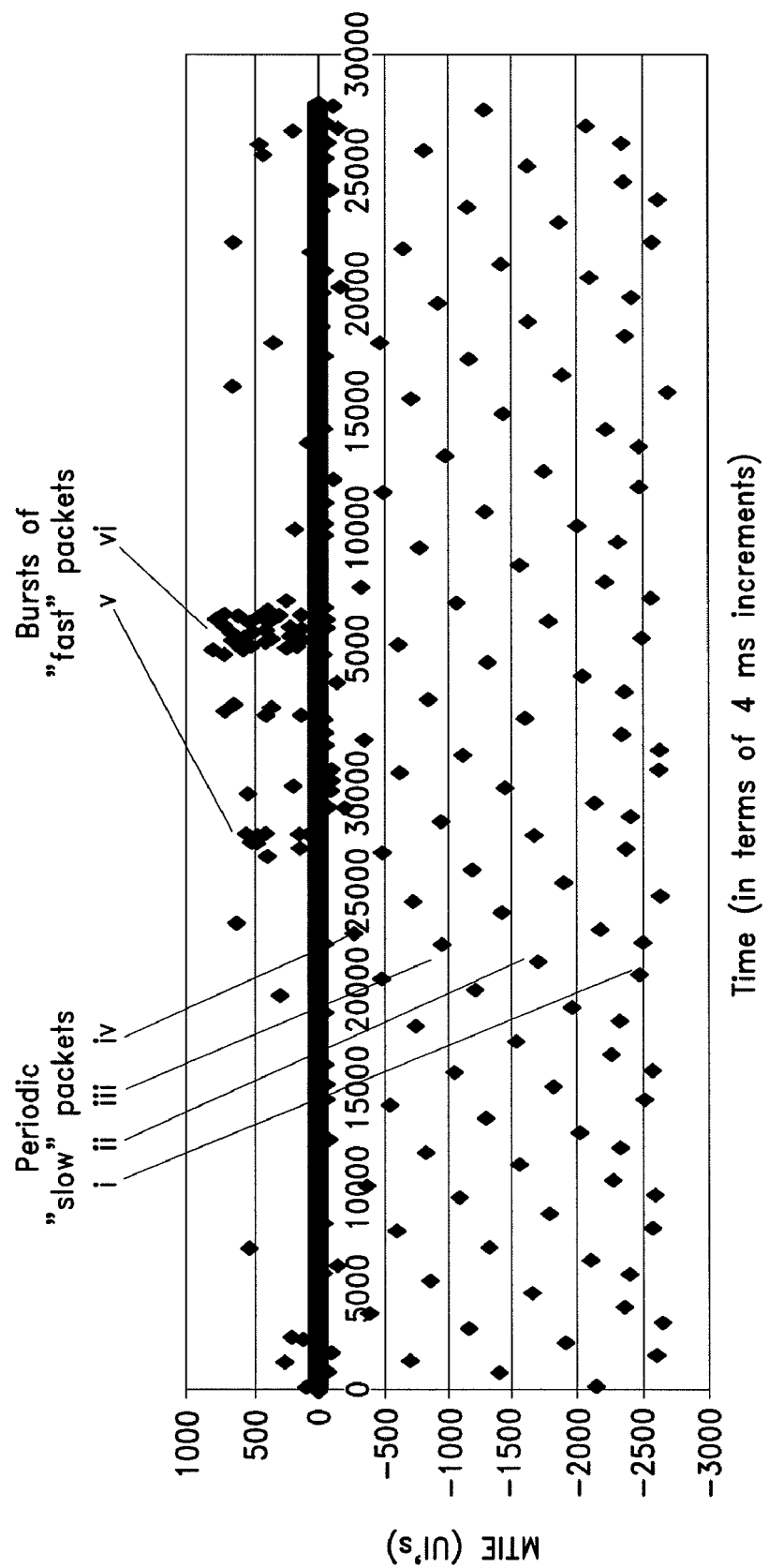
FIG. 2 illustrates the effect of an incorrectly configured switch that was inadvertently programmed to half duplex operation rather than full duplex.

FIG. 2 illustrates the effect of an incorrectly configured switch that was inadvertently programmed to half duplex operation rather than full duplex. FIG. 2 shows, as an example, the effects of an incorrectly configured Cisco® switch, which was inadvertently programmed to 100 Mbps half duplex operation rather than full duplex. The vertical axis shows relative packet delays (jitter) through the Cisco® switch measured in UIs, and the horizontal axis represents time (in hundreds of microseconds). Each point indicates, the arrival of a pseudowire packet. FIG. 2 represents approximately 10 minutes of traffic samples.

FIG. 2 illustrates anomalous link behaviour that resulted from programming the link speed from full to half duplex. Part of this anomalous behaviour is the slow packets, listed as i, ii, iii, and iv, which although periodic in nature, can be filtered out by software that uses fastest packets for timing determination. Also shown is the odd behaviour of bursts "v" and "vi" of fast packets which occurred as a result of the full to half duplex setting. These fast bursts of packets can affect timing recovery and result in a change that can only be seen through the MTIE estimator according to an exemplary embodiment of the present invention. Thus, in this example, a network change in which an interface is changed from full to half duplex, caused packet delay variations which resulted in an MTIE alarm being raised. The MTIE alarm is raised at the same time as the network change was implemented, allowing the network engineer to quickly flag the install crew that they changed a parameter which affected the clock recovery. Accordingly, it is the ability to detect a clock fault condition as the condition where the control loop is not maintaining the T1 MTIE requirements and alarm it that various exemplary embodiments of the present invention addresses.

Figure 3:
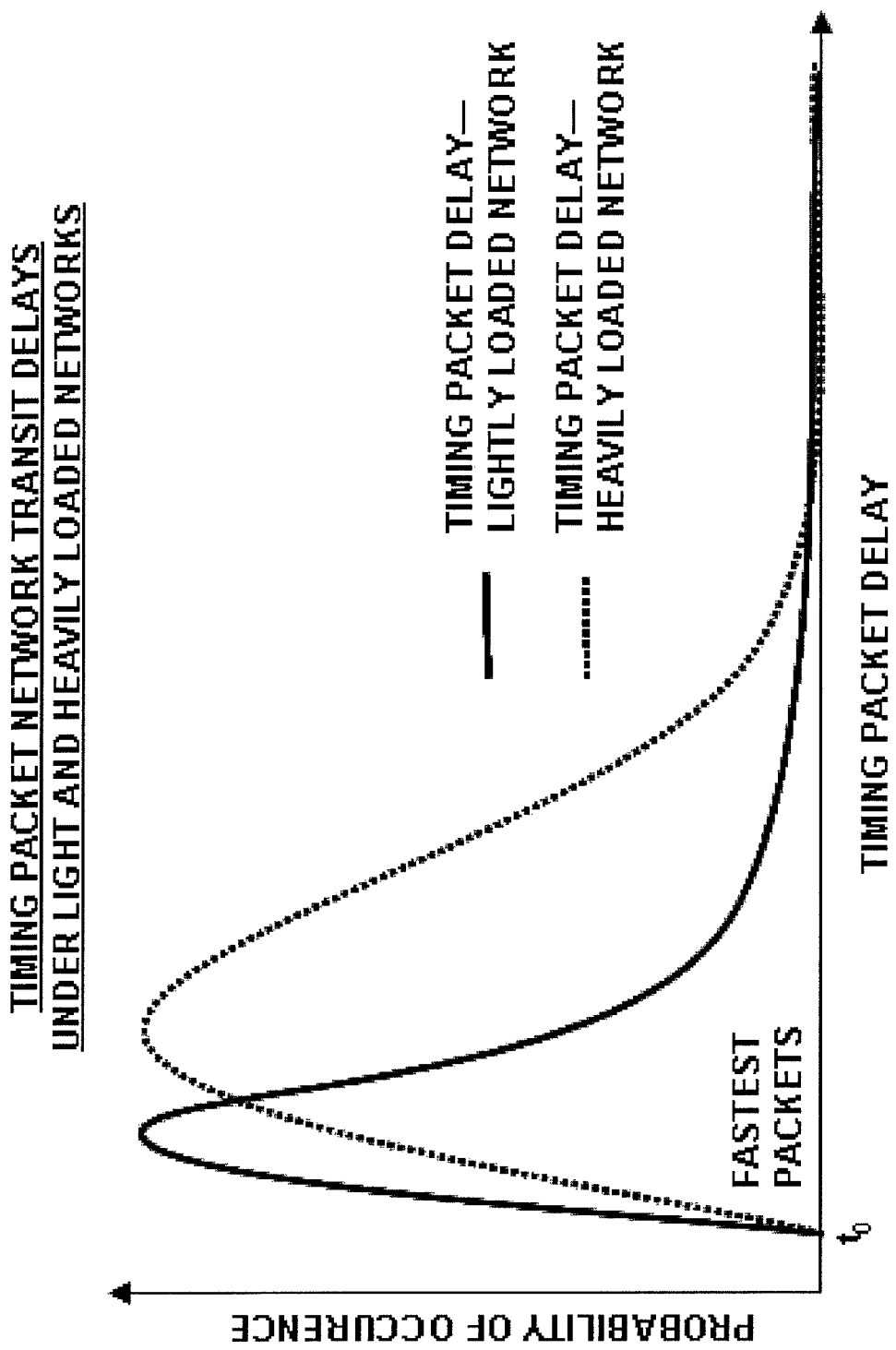
FIG. 3 illustrates timing packet network transit delays under light and heavily loaded networks.

Accordingly, a first aspect of the present invention provides for the selective use of the "fastest packets", or more specifically, those packets with the lowest network transit delay. As is well known to those of ordinary skill in the art of the present invention, network delay changes with respect to network loading, such that higher network loading will cause greater packet latency. As is also well known to those of ordinary skill in the art of the present invention, average and maximum packet delays increase with network loading. As network loading approaches 100%, average and maximum packet transit time delays increase exponentially. However, minimum packet transit times remain substantially constant over most network loading conditions, barring the exceptional case of near 100% loading. FIG. 3 illustrates theoretical timing packet network transit delays under light and heavily loaded networks. The minimum packet transit delay is shown as time $t_0$ in FIG. 3. This delay is achieved by the fastest packets and is a statistical data point.

According to a preferred embodiment of the present invention, the static value of $t_0$ is used as an absolute reference point for zero packet delay maximum time interval error (MTIE) for a given network topology. When the network topology changes, a new value of $t_0$ is calculated, and used as the reference point for a new zero packet MTIE.

Zero packet MTIE—$t_0$—is a statistical parameter, calculated by processing as many packet delay samples as required to achieve an accurate estimate of minimum packet delay. Once to is determined for a static network topology, control algorithms adjust the regenerated T1 clock to maintain to constant, representing a substantially zero MTIE. Thus, the system and method according to an exemplary embodiment of the present invention constantly re-estimate $t_0$. The re-estimation of to is recorded as an ongoing measure of MTIE and used to adjust the clock in the device (e.g. a BTS) being controlled.

As can be appreciated to those of ordinary skill in the art of the present invention, different algorithms can be used to estimate $t_0$. An example of such an algorithm operates a proportional/integral/derivative (PID) control loop to optimize the clock. According to an exemplary embodiment of the present invention, the MTIE estimator shows how far the PID or other control algorithm is swinging in T1 bit times based on the packet arrival time stamps. The different algorithms are designed to keep the relative time difference of the received packet stream small with respect to to, and bounded by allowed MTIE of 28 UI per 24 hours. If there are any excursions beyond this limit implies then it can be ascertained, according to the present invention, that the data being fed to the PID or other control loop is misbehaving.

As those of ordinary skill in the present art can appreciate, substantially all control algorithms employ models for both the system to be controlled as well as for the received data used to control the system. The models may be linear or non-linear. A linear control system would be a PID controller, where the feedback control signal is proportional to either the error of $(t_N-t_0)$ multiplied by a constant $K_p$, or the proportional to the derivative of $(t_N-t_0)$ with respect to time multiplied by a different constant $K_d$, or proportional to the integral of the error of $(t_N-t_0)$ multiplies by a constant $K_i$. A non-linear control system could be similar to a linear control system, but for example where the gain of the control loop is exponentially increased based on the error $(t_N-t_0)$, so for example, the proportional gain is $K_p$ for error signal $(t_N-t_0)<10$, but increases to $2*K_p$ for $(t_N-t_0)\geq 10$. The model for the crystal (i.e., to generate the receive clock), for example, can define the allowed range of digital control values and corresponding relative frequency change in parts per billion. The non-linear model for the timing packet delay samples can assume network topology changes resulting in stepwise changes to the network delay. Other non-linear aspects can address microbeating of the timing packets with other similar timed packets. When the models are correct, the control system works as designed and maintains to within the specifications for a traffic T1. This is shown in FIG. 4, which illustrates packet maximum time interval error rate when correct linear and non-linear models are used to replicate both the system and the data used within the system according to an embodiment of the present invention.

Figure 4:
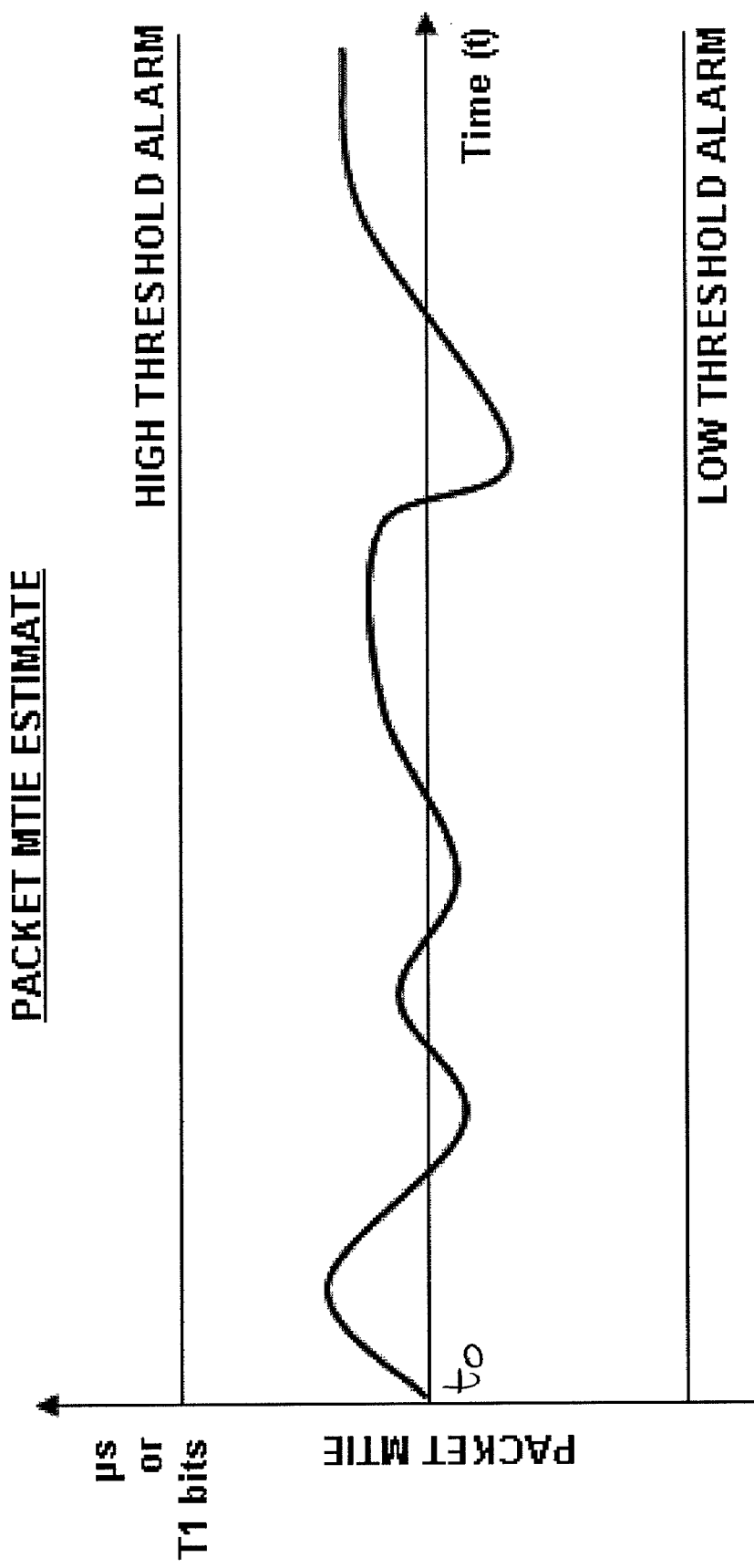
FIG. 4 illustrates packet maximum time interval error rate when correct linear and non-linear models are used to replicate both the system and the data used within the system according to an embodiment of the present invention.
Figure 5:
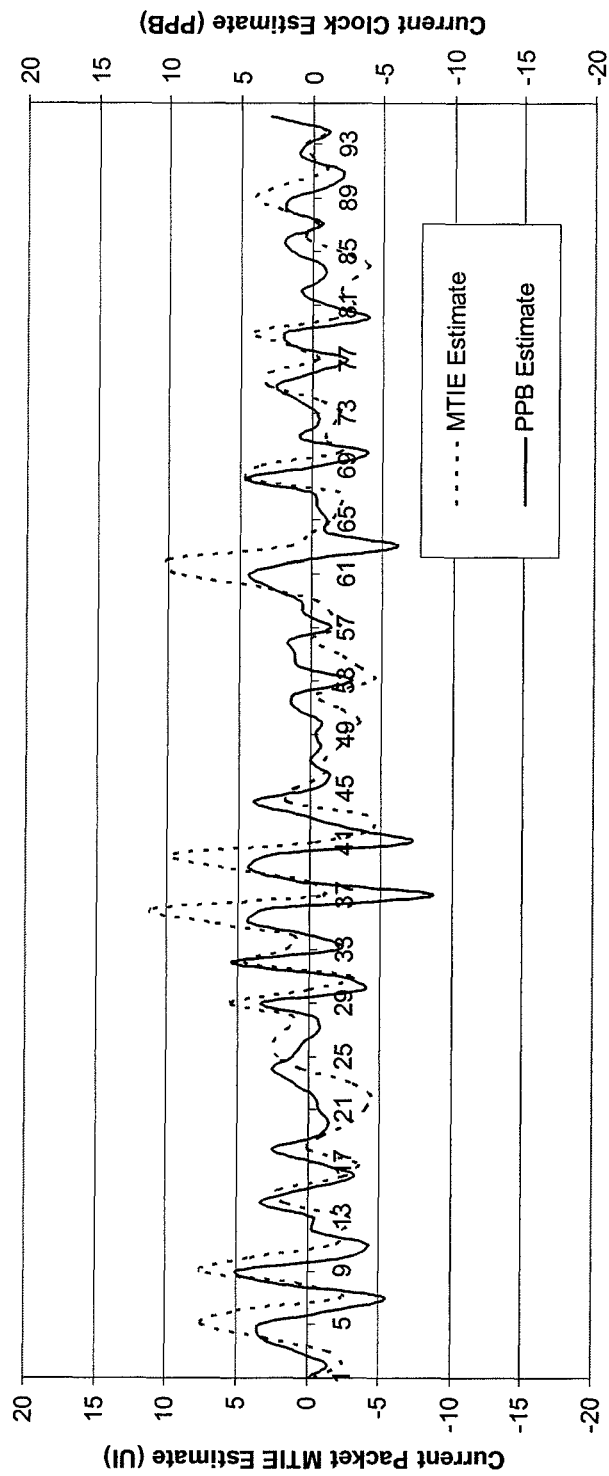
FIG. 5 illustrates a current packet maximum time interval error for a specific circuit for a first time period according to an exemplary embodiment of the present invention.
Figure 8:
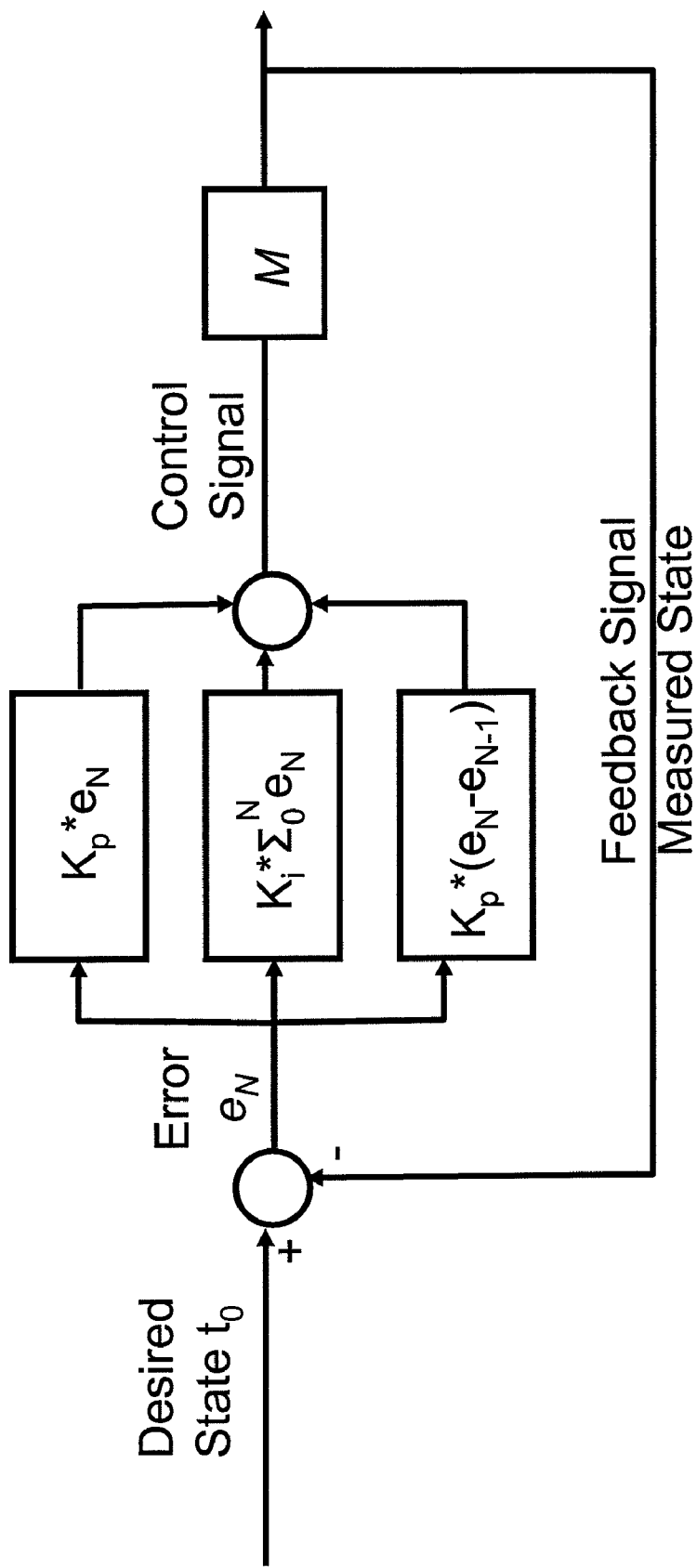
FIG. 8 illustrates an exemplary phase lock loop control system for use in controlling timing of a T1/DS1 clock in a psuedowire or packet data flow circuit according to an embodiment of the present invention.

FIG. 4, although theoretical, shows that the normal operation of the control loop is to work well within the defined MTIE and PPB bounds required for T1 circuits. The control loop according to a preferred embodiment of the present invention is a phase locked loop control system, as shown in FIG. 8. FIG. 5 illustrates a current packet maximum time interval error for a specific circuit for a first time period according to an exemplary embodiment of the present invention. The data for FIG. 5 was extracted from an exemplary embodiment of the present invention, a live BelAir® Networks mesh network carrying pseudowire traffic. FIG. 5 represents actual performance data of current packet maximum time interval error estimation over about a 24 hour (96 interval) period. Also shown on FIG. 5 is an error estimation in PPB based on the recovered pseudowire streams and their relative position in the receive buffer.

Figure 6:
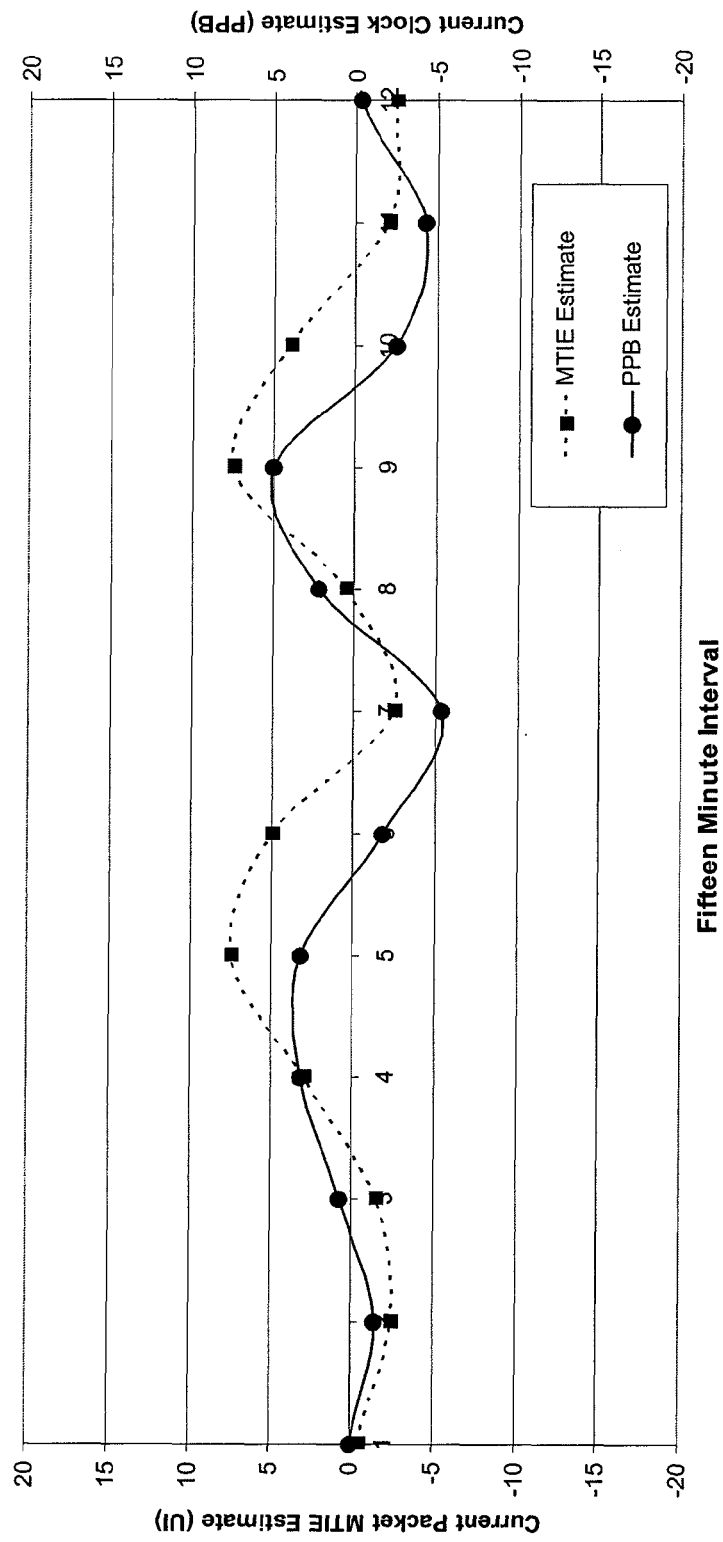
FIG. 6 illustrates current packet maximum time interval error for a specific circuit for a second time period according to an exemplary embodiment of the present invention.

FIG. 6 illustrates current packet maximum time interval error for a specific circuit for a second time period according to an exemplary embodiment of the present invention. FIG. 6 illustrates the MTIE and PPB error estimates based on the packet data streams over a shorter time period of about 3 hours, or twelve intervals of approximately 15 minutes each. According to a exemplary embodiment of the present invention, the PPB estimation, which is based on the differential of the packet MTIE estimation, can be roughly approximated as:

*PPB* Error[*n*]=(*MTIE*[*n*]−*MTIE*[*n*−1])*(647000 ps)/
(15 minutes*60 seconds), so that the scaling factor between PPB and differential MTIE estimation is approximately 0.9:1.

Figure 7:
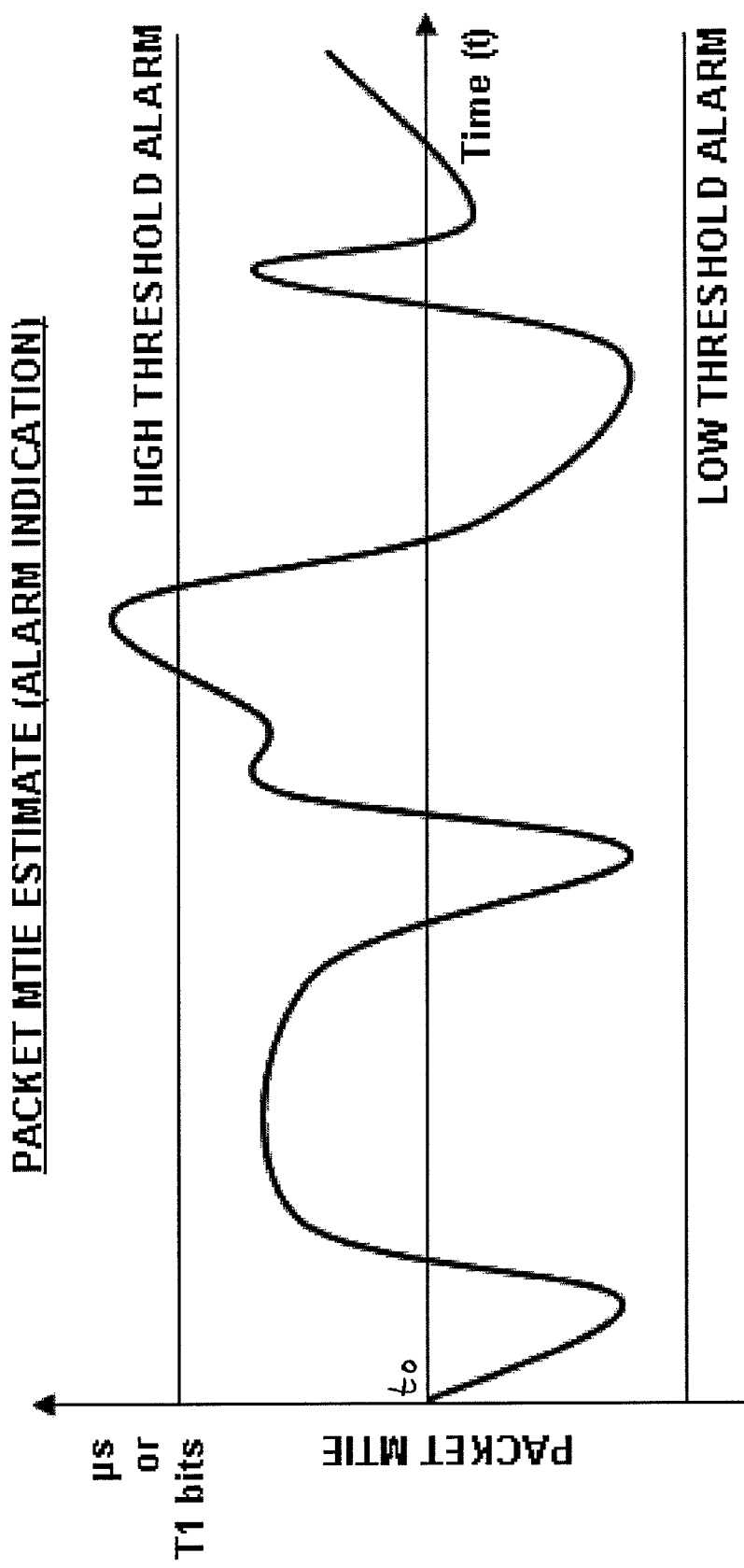
FIG. 7 illustrates current packet maximum time interval error with an alarm condition according to an exemplary embodiment of the present invention.

If, however, the packet MTIE exceeds a defined threshold, or the PPB estimate exceeds an alternate defined threshold, then most often, the packet timing samples are not behaving according to the model, indicating a problem with the network packet delay statistics. FIG. 7 illustrates a current packet maximum time interval error with an alarm condition according to an exemplary embodiment of the present invention. In the case shown in FIG. 7, the high threshold alarm has been exceeded. An alarm would be raised if the condition persists for a specified period of time (a process known as "debouncing"), or if the PPB estimate exceeded a defined allowed error threshold. For example, if the PPB estimate exceeded the 50 ppb specification for a single 15 minute interval, then the resulting T1 buffer error in the subtending equipment could be as high as 15*60*0.1=90 μs, or approximately 140 UI. This condition would need to be alarmed, as most T1 buffers in subtending equipment are rated only for ±128 UI and the MTIE estimate is not an absolute value.

Alarms raised as a result of MTIE thresholds being exceeded, or PPB estimates being exceeded, do not inform the NOC of the cause of the clock error, only that there is a clock error and that the recovered clock is not meeting required specifications. An alarm condition can be used by the NOC to aid in the determination of the cause. As is often the case, the root cause is a direct result of NOC intervention, either changing of circuits, and these changes can be retracted quickly if the alarm condition is presented.

According to a further exemplary embodiment of the present invention, a system and method are provided to extrapolate the T1 timing error based on the Packet MTIE estimator. The system and method for extrapolation according to an exemplary embodiment of the present invention utilizes the transfer function of the control algorithm in conjunction with the calculated packet MTIE estimate to estimate the T1 MTIE value. The estimated T1 MTIE values are then used to set the alarm thresholds.

FIG. 9 illustrates an exemplary control system wherein timing for recovery of a pseudowire data stream is derived from the pseudowire data stream according to an embodiment of the present invention. FIG. 9 illustrates the control system wherein the pseudowire data stream is used as the timing source, and is timed from the pseudowire unit 4 which is locally timed from line interface unit (LIU) 4. As data enters LIU 2, a T1 data clock time-stamps each packet. The T1 data is then transmitted as packets wired or wirelessly via network 6, and recovered at converter 8, and LIU 10. LIU 10 time-stamps the recovered data packet with its own T1 data clock which is free-running compared to the transmitting T1 data clock. The rate of change in the difference between the two clock's time-stamps indicates whether one clock is faster than the other. A delta-t that is increasing means the receive clock is running faster; and if delta-t is decreasing, then the local receive clock is running slower.

FIG. 9 further includes an exemplary proportional integral derivative (PID) controller which forms the PLL control system 12. Part of control system 12 is a monitoring function, which includes two taps: a first limiter 14 for alarming excessive MTIE events, and a derivative function block 16 followed by a second limiter 18 for alarming excessive clock error conditions. According to a preferred embodiment of the present invention, the clock error condition will alarm when clock errors exceeds a threshold of about 100 ppb.

FIG. 10 illustrates an exemplary control system wherein timing for recovery of a pseudowire data stream is derived from an IEEE 1588 timed local clock 26 according to an embodiment of the present invention. FIG. 10 is similar to FIG. 6; however, the regenerated T1 timing is derived from an IEEE 1588 local clock 26 and not from the pseudowire stream. The IEEE 1588 local clock 26 relies on exchanging timing messages and control with an IEEE 1588 timing source 24 located in the network. The IEEE 1588 timing source 24 uses the same stratum traceable timing reference as LIU 2, so the end result is that the regenerated IEEE 1588 clock in pseudowire box 20 should have the same timing as the network. Accordingly, the exemplary embodiment of the present invention illustrated in FIG. 10 illustrates a system to monitor and alarm the operation of the IEEE 1588 using almost the same circuitry as shown in FIG. 9, with the addition of IEEE 1588 timing source 24. Pseudowire alarm monitor 22 is also shown in FIG. 10, and includes two taps: a first limiter 14 for alarming excessive MTIE events, and a derivative function block 16 followed by a second limiter 18 for alarming excessive clock error conditions. The output of the timestamp filtering is combined with an output from an IEEE 1588 timed local clock to for the timestamp extraction used to receiver T1 data signals. According to a preferred embodiment of the present invention, the clock error condition will alarm when clock errors exceeds a threshold of about 100 ppb.

Exemplary embodiments of the present invention can be implemented as a computer program that can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. As used herein, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

The present invention has been described with reference to certain exemplary embodiments thereof. However, it will be readily apparent to those skilled in the art that it is possible to embody the invention in specific forms other than those of the exemplary embodiments described above. This may be done without departing from the spirit and scope of the invention. The exemplary embodiments are merely illustrative and should not be considered restrictive in any way. The scope of the invention is defined by the appended claims and their equivalents, rather than by the preceding description.

All United States patents and applications, foreign patents, and publications discussed above are hereby incorporated herein by reference in their entireties.

What is claimed is:

1. A method for estimating a maximum time interval error of a T1 data signal derived from a pseudowire data stream, comprising the steps of:
   (a) establishing an initial relative delay of the pseudowire packet arrival times $t_N$;
   (b) monitoring changes to the relative delay $t_N$; and
   (c) obtaining a maximum time interval error (MTIE) based on the monitored changes to the relative delay.

2. The method according to claim 1, wherein the step of establishing an initial relative delay of the pseudowire packet arrival times $t_N$ comprises using a plurality of fastest packets in the pseudowire data stream.

3. The method according to claim 1, wherein the step of monitoring changes to the relative delay $t_N$ comprises:
   estimating a subsequent relative delay $t_{N+1}$ of the pseudowire packet arrival times $t_N$; and
   subtracting $t_N$ from $t_{N+1}$ of the plurality of the fastest packets.

4. The method according to claim 1, wherein the step of monitoring changes to the relative delay $t_N$ comprises:
   calculating differences between subsequent relative delays to indicate a maximum time interval error for the packet data network.

5. The method according to claim 1, wherein the step of obtaining a maximum time interval error is estimated over a maximum time interval of fifteen minutes or 24 hours.

6. The method according to claim 1, further comprising:
   raising an alarm if an absolute value of $t_N-t_{N-1}$ exceeds at least one predetermined threshold wherein $t_{N-1}$ is a subsequent relative delay.

7. The method according to claim 6, wherein the at least one predetermined threshold can be expressed as one of bit periods, microseconds, or substantially any time period.

8. The method according to claim 6, wherein the at least one predetermined threshold comprises a T1.101 specification threshold.

9. The method according to claim 6, wherein the at least one predetermined threshold comprises a T1 jitter buffer threshold.

10. The method according to claim 6, wherein the T1 jitter buffer threshold comprises about ±128 micro-intervals (UI).

11. The method according to claim 1, further comprising:
    raising the alarm only if the absolute value of $t_N-t_{N-1}$ exceeds at least one predetermined threshold a predetermined number of times in a predetermined time period wherein $t_{N-1}$ is a subsequent relative delay.

12. The method according to claim 1, wherein the relative delay $t_N$ is derived from pseudowire packet time-stamps.

13. The method according to claim 1, wherein the relative delay $t_N$ is derived from pseudowire packet arrival times.

14. The method according to claim 1, wherein the relative delay $t_N$ is derived from either the fastest pseudowire packet arrival times, or a mean delay of the pseudowire packet arrival times.

15. The method according to claim 1, wherein the MTIE is defined in unit intervals, microseconds, or substantially any other unit of time.

16. A method for estimating a T1 clock error of a T1 data signal derived from a pseudowire data stream, comprising the steps of:
    (a) establishing an initial relative delay of the pseudowire packet arrival times $t_N$;
    (b) monitoring changes to the relative delay $t_N$; and
    (c) estimating the T1 clock error by estimating the rate of change of the relative delay $t_N$.

17. The method according to claim 16, wherein the relative delay $t_N$ is derived from pseudowire packet time-stamps.

18. The method according to claim 16, wherein the relative delay $t_N$ is derived from pseudowire packet arrival times.

19. The method according to claim 16, wherein the relative delay $t_N$ is derived from either the fastest pseudowire packet arrival times, or a mean delay of the pseudowire packet arrival times.

20. The method according to claim 16, wherein the step of estimating the T1 clock error comprises:
    calculating differences between subsequent relative delays to indicate a maximum time interval error for the packet data network; and
    calculating a difference between subsequent MTIE values.

21. The method according to claim 16, wherein the T1 clock error is defined in either parts per billion, or parts per million.

22. A method for estimating pseudowire packet current clock estimate errors in packet data networks comprising:
  (a) determining an initial maximum time interval error estimate, MTIE[n], and a subsequent maximum time interval error estimate MTIE[n+1];
  (b) determining a current clock estimate error by calculating a derivative of a difference between MTIE[n] and MTIE[n+1] over a predetermined period of time; and
  (c) continuously updating the current clock estimate error by repeating steps (a) and (b) until n reaches a predetermined number.

23. The method according to claim 22, wherein the maximum time interval error estimate is determined over a maximum time interval of fifteen minutes or 24 hours.

24. The method according to claim 22, further comprising:
  raising an alarm if an absolute value of MTIE[n+1]-MTIE[n] exceeds at least one predetermined threshold.

25. The method according to claim 24, wherein the at least one predetermined threshold can be expressed as one of parts per billion of a unit interval, parts per million of a unit interval, or substantially any time period.

26. The method according to claim 24, wherein the at least one predetermined threshold comprises a global system for mobile communications (GSM) micro base transceiver station (BTS) specification threshold.

27. The method according to claim 26, wherein the GSM micro base transceiver station specification threshold is about +/−50 parts per billion.

28. The method according to claim 26, wherein the GSM pico BTS specification threshold is about +/−100 parts per billion.

29. The method according to claim 22, further comprising:
  raising the alarm only if the absolute value of MTIE[n+1]-MTIE[n] exceeds at least one predetermined threshold a predetermined number of times in a predetermined time period.

30. The method according to claim 22, wherein the step of determining a current clock estimate error comprises:
  integrating a difference between MTIE[n] and MTIE[n+1] over a predetermined period of time.

31. A method for estimating pseudowire packet maximum time interval errors in packet data networks comprising:
  (a) estimating an initial relative delay $t_N$ of a plurality of fastest packets of a pseudowire data stream, wherein n is originally set to zero;
  (b) monitoring timing of a T1 data signal derived from an IEEE 1588 precision timing source; and
  (c) verifying the timing of the T1 data signal derived from the IEEE 1588 precision timing source by
    using the initial relative delay $t_N$ as a zero maximum time interval error reference, and
    estimating a subsequent relative delay $t_{N+1}$ of the plurality of the fastest packets,
    subtracting $t_N$ from $t_{N+1}$ and using the difference between adjacent relative delays to further verify timing of the T1 data signal, such that
    if the difference between adjacent relative delays exceeds a predetermined threshold, verifying that the timing of the T1 data signal derived from the IEEE 1588 precision timing source is in error.

32. The method according to claim 31, wherein the step of estimating the relative delay $t_N$ of the plurality of fastest packets of a pseudowire data stream comprises: using the IEEE 1588 precision timing source to estimate the relative delay.

33. The method according to claim 31, further comprising:
  raising an alarm if an absolute value of $t_{N+1}-t_N$ exceeds at least one predetermined threshold.

34. The method according to claim 33, wherein the at least one predetermined threshold can be one of bit periods or microseconds.

35. The method according to claim 33, wherein the at least one predetermined threshold comprises a T1.101 specification threshold.

36. The method according to claim 33, wherein the at least one predetermined threshold comprises a T1 jitter buffer threshold.

37. The method according to claim 36, wherein the T1 jitter buffer threshold comprises about ±128 micro-intervals (UI).

38. The method according to claim 31, further comprising:
  raising the alarm only if the absolute value of $t_{N+1}-t_N$ exceeds at least one predetermined threshold a predetermined number of times in a predetermined time period.

39. A system for estimating a maximum time interval error of a T1 data signal derived from a pseudowire data stream, comprising:
  a T1 data signal receiver configured to receive a pseudowire data stream, wherein the T1 data signal receiver includes a T1 data signal processor, and wherein
  the T1 data signal processor is configured to
    (a) establish an initial relative delay of the pseudowire packet arrival times $t_N$,
    (b) monitor changes to the relative delay $t_N$, and
    (c) obtain a maximum time interval error (MTIE) based on the monitored changes to the relative delay.

40. The system according to according to claim 39, wherein the T1 data signal processor is further configured to use a plurality of fastest packets in the pseudowire data stream to establish an initial relative delay of the pseudowire packet arrival times $t_N$.

41. The system according to according to claim 39, wherein the T1 data signal processor is further configured to estimate a subsequent relative delay $t_{N+1}$ of the pseudowire packet arrival times $t_N$, and
  subtract $t_N$ from $t_{N+1}$ of the plurality of the fastest packets to monitor changes to the relative delay $t_N$.

42. The system according to claim 39, wherein the relative delay $t_N$ is substantially constant if at least one of jitter, wander and phase transients remains at or below an ANSI T1.403-1999 specification value for jitter, wander or phase transients.

43. The system according to according to claim 39, wherein the T1 data signal processor is further configured to estimate maximum time interval error over a maximum time interval of fifteen minutes or 24 hours.

44. The system according to according to claim 39, wherein the T1 data signal processor is further configured to raise an alarm if an absolute value of $t_N-t_{N-1}$ exceeds at least one predetermined threshold wherein $t_{N-1}$ is a subsequent relative delay.

45. The system according to claim 44, wherein the at least one predetermined threshold can be expressed as one of bit periods, microseconds, or substantially any time period.

46. The system according to claim 44, wherein the at least one predetermined threshold comprises a T1.101 specification threshold.

47. The system according to claim 44, wherein the at least one predetermined threshold comprises a T1 jitter buffer threshold.

48. The system according to claim 44, wherein the T1 jitter buffer threshold comprises about ±128 micro-intervals (UI).

49. The system according to according to claim 39, wherein the T1 data signal processor is further configured to
raise the alarm only if the absolute value of $t_N - t_{N-1}$ exceeds at least one predetermined threshold a predetermined number of times in a predetermined time period wherein $t_{N-1}$ is a subsequent relative delay.

50. The system according to claim 39, wherein the relative delay $t_N$ is derived from pseudowire packet time-stamps.

51. The system according to claim 39, wherein the relative delay $t_N$ is derived from pseudowire packet arrival times.

52. The system according to claim 39, wherein the relative delay $t_N$ is derived from either the fastest pseudowire packet arrival times, or a mean delay of the pseudowire packet arrival times.

53. The system according to claim 39, wherein the MTIE is defined in unit intervals, microseconds, or substantially any other unit of time.

54. A system for estimating a T1 clock error of a T1 data signal derived from a pseudowire data stream, comprising:
a T1 data signal receiver configured to receive a pseudowire data stream, wherein the T1 data signal receiver includes a T1 data signal processor, and wherein the T1 data signal processor is configured to
(a) establish an initial relative delay of the pseudowire packet arrival times $t_N$,
(b) monitor changes to the relative delay $t_N$, and
(c) estimate the T1 clock error by estimating the rate of change of the relative delay $t_N$.

55. The system according to claim 54, wherein the relative delay $t_N$ is derived from pseudowire packet time-stamps.

56. The system according to claim 54, wherein the relative delay $t_N$ is derived from pseudowire packet arrival times.

57. The system according to claim 54, wherein the relative delay $t_N$ is derived from either the fastest pseudowire packet arrival times, or a mean delay of the pseudowire packet arrival times.

58. The system according to claim 54, wherein the T1 data signal processor is further configured to
calculate differences between subsequent relative delays to indicate a maximum time interval error for the packet data network, and
calculate a difference between subsequent MTIE values to estimate the T1 clock error.

59. The system according to claim 54, wherein the T1 clock error is defined in either parts per billion, or parts per million.

60. A system for estimating pseudowire packet current clock estimate errors in packet data networks, comprising:
a T1 data signal receiver configured to receive a pseudowire data stream, wherein the T1 data signal receiver includes a T1 data signal processor, and wherein
the T1 data signal processor is configured to
(a) determine an initial maximum time interval error estimate, MTIE[n], and a subsequent maximum time interval error estimate MTIE[n+1],
(b) determine a current clock estimate error by calculating a derivative of a difference between MTIE[n] and MTIE[n+1] over a predetermined period of time, and
(c) continue to update the current clock estimate error by repeating the determinations of (a) and (b) until n reaches a predetermined number.

61. The system according to claim 60, wherein the maximum time interval error estimate is determined over a maximum time interval of fifteen minutes or 24 hours.

62. The system according to claim 60, wherein the T1 data signal processor is further configured to
raise an alarm if an absolute value of MTIE[n+1]-MTIE[n] exceeds at least one predetermined threshold.

63. The system according to claim 62, wherein the at least one predetermined threshold can be expressed as one of parts per billion of a unit interval, parts per million of a unit interval, or substantially any time period.

64. The system according to claim 62, wherein the at least one predetermined threshold comprises a global system for mobile communications (GSM) micro base transceiver station (BTS) specification threshold.

65. The system according to claim 64, wherein the GSM micro base transceiver station specification threshold is about +/−50 parts per billion.

66. The system according to claim 64, wherein the GSM pico BTS specification threshold is about +/−100 parts per billion.

67. The system according to claim 60, wherein the T1 data signal processor is further configured to
raise the alarm only if the absolute value of MTIE[n+1]-MTIE[n] exceeds at least one predetermined threshold a predetermined number of times in a predetermined time period.

68. The system according to claim 60, wherein the T1 data signal processor is further configured to integrate a difference between MTIE[n] and MTIE[n+1] over a predetermined period of time to determine the current clock estimate error.

69. A system for estimating pseudowire packet maximum time interval errors in packet data networks comprising:
a T1 data signal receiver configured to receive a pseudowire data stream, wherein the T1 data signal receiver includes a T1 data signal processor, and wherein
the T1 data signal processor is configured to
(a) estimate an initial relative delay $t_N$ of a plurality of fastest packets of a pseudowire data stream, wherein n is originally set to zero,
(b) monitor timing of a T1 data signal derived from an IEEE 1588 precision timing source; and
(c) verify the timing of the T1 data signal derived from the IEEE 1588 precision timing source by
use of the initial relative delay $t_N$ as a zero maximum time interval error reference,
estimate a subsequent relative delay $t_{N+1}$ of the plurality of the fastest packets, and
subtract $t_N$ from $t_{N+1}$ and using the difference between adjacent relative delays to further verify timing of the T1 data signal, such that
if the difference between adjacent relative delays exceeds a predetermined threshold, verify that the timing of the T1 data signal derived from the IEEE 1588 precision timing source is in error.

70. The system according to claim 69, wherein the T1 data signal processor is further configured to
use the IEEE 1588 precision timing source to estimate the relative delay $t_N$ of the plurality of fastest packets of a pseudowire data stream.

71. The system according to claim 69, wherein the T1 data signal processor is further configured to
raise an alarm if an absolute value of $t_{N+1} - t_N$ exceeds at least one predetermined threshold.

72. The system according to claim 71, wherein the at least one predetermined threshold can be one of bit periods or microseconds.

73. The system according to claim 71, wherein the at least one predetermined threshold comprises a T1.101 specification threshold.

74. The system according to claim 71, wherein the at least one predetermined threshold comprises a T1 jitter buffer threshold.

75. The system according to claim 74, wherein the T1 jitter buffer threshold comprises about ±128 micro-intervals (UI).

76. The system according to claim 69, further wherein the T1 data signal processor is further configured to
raise the alarm only if the absolute value of $t_{N+1} - t_N$ exceeds at least one predetermined threshold a predetermined number of times in a predetermined time period.

* * * * *

UNITED STATES PATENT AND TRADEMARK OFFICE
CERTIFICATE OF CORRECTION

| | | |
|---|---|---|
| PATENT NO. | : 7,821,958 B2 | Page 1 of 1 |
| APPLICATION NO. | : 11/963524 | |
| DATED | : October 26, 2010 | |
| INVENTOR(S) | : Smith et al. | |

It is certified that error appears in the above-identified patent and that said Letters Patent is hereby corrected as shown below:

In Column 1, Line 35, delete "mod" and insert -- mode --, therefor.

In Column 9, Line 31, delete "MTIE[N]" and insert -- MTIE[n] --, therefor.

In Column 10, Line 66, delete "psuedowire" and insert -- pseudowire --, therefor.

In Column 12, Line 53, delete "to" and insert -- $t_0$ --, therefor.

In Column 12, Line 65, delete "to," and insert -- $t_0$, --, therefor.

In Column 18, Line 34, in Claim 40, delete "according to according to" and insert -- according to --, therefor.

In Column 18, Line 40, in Claim 41, delete "according to according to" and insert -- according to --, therefor.

In Column 18, Line 50, in Claim 43, delete "according to according to" and insert -- according to --, therefor.

In Column 18, Line 54, in Claim 44, delete "according to according to" and insert -- according to --, therefor.

In Column 19, Line 3, in Claim 49, delete "according to according to" and insert -- according to --, therefor.

Signed and Sealed this
Fifth Day of February, 2013

Teresa Stanek Rea
*Acting Director of the United States Patent and Trademark Office*